United States Patent [19]

Ebbinge

[11] 4,179,004

[45] Dec. 18, 1979

[54] FORCE MULTIPLYING LOAD CELL

[75] Inventor: Willem Ebbinge, Petaluma, Calif.

[73] Assignee: National Controls, Inc., Santa Rosa, Calif.

[21] Appl. No.: 878,063

[22] Filed: Feb. 15, 1978

[51] Int. Cl.² .......................... G01G 3/14; G01L 5/12
[52] U.S. Cl. .................................. 177/211; 73/141 A; 177/DIG. 9
[58] Field of Search ........................ 177/211, DIG. 9; 73/141 A

[56] References Cited

U.S. PATENT DOCUMENTS

| | | | |
|---|---|---|---|
| 3,161,046 | 12/1964 | Farley | 73/141 A |
| 3,554,026 | 1/1971 | Seed | 177/211 X |
| 3,709,311 | 1/1973 | Appius | 177/DIG. 9 |
| 3,734,218 | 5/1973 | Kupper | 177/DIG. 9 |
| 3,837,416 | 9/1974 | Nozaki | 177/211 X |
| 4,020,686 | 5/1977 | Brendel | 73/141 A |
| 4,036,316 | 7/1977 | Rock | 177/DIG. 3 |

FOREIGN PATENT DOCUMENTS 2542783 6/1976 Fed. Rep. of Germany ........... 177/211

Primary Examiner—George H. Miller, Jr.
Attorney, Agent, or Firm—Flehr, Hohbach, Test

[57] ABSTRACT

Load cell in which the magnitude of a force, such as the weight of a load, is determined by the stress produced in a bending beam to which the load is applied. A lever system permits the use of a thicker beam which results in highly accurate and repeatable readings even in load cells of relatively low capacity, e.g. less than 2 pounds. One embodiment has two load receiving arms connected to different points in the lever system to provide a dual capacity load cell.

22 Claims, 3 Drawing Figures

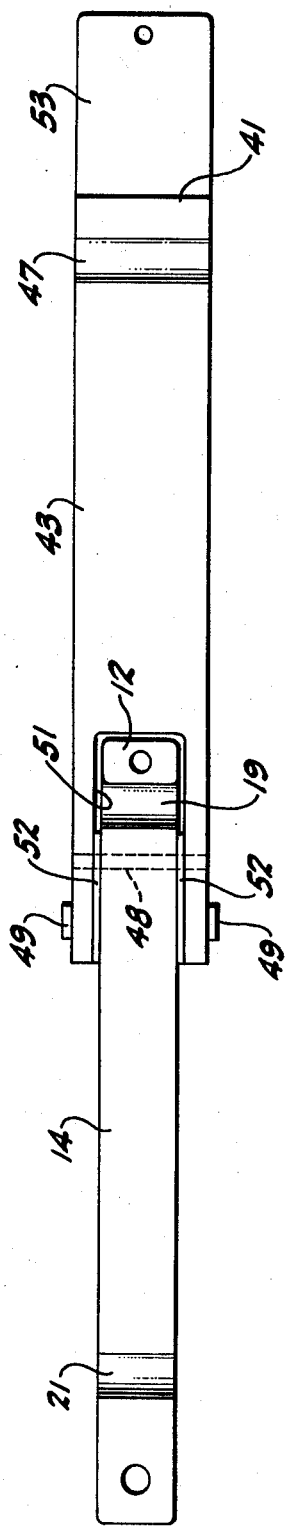
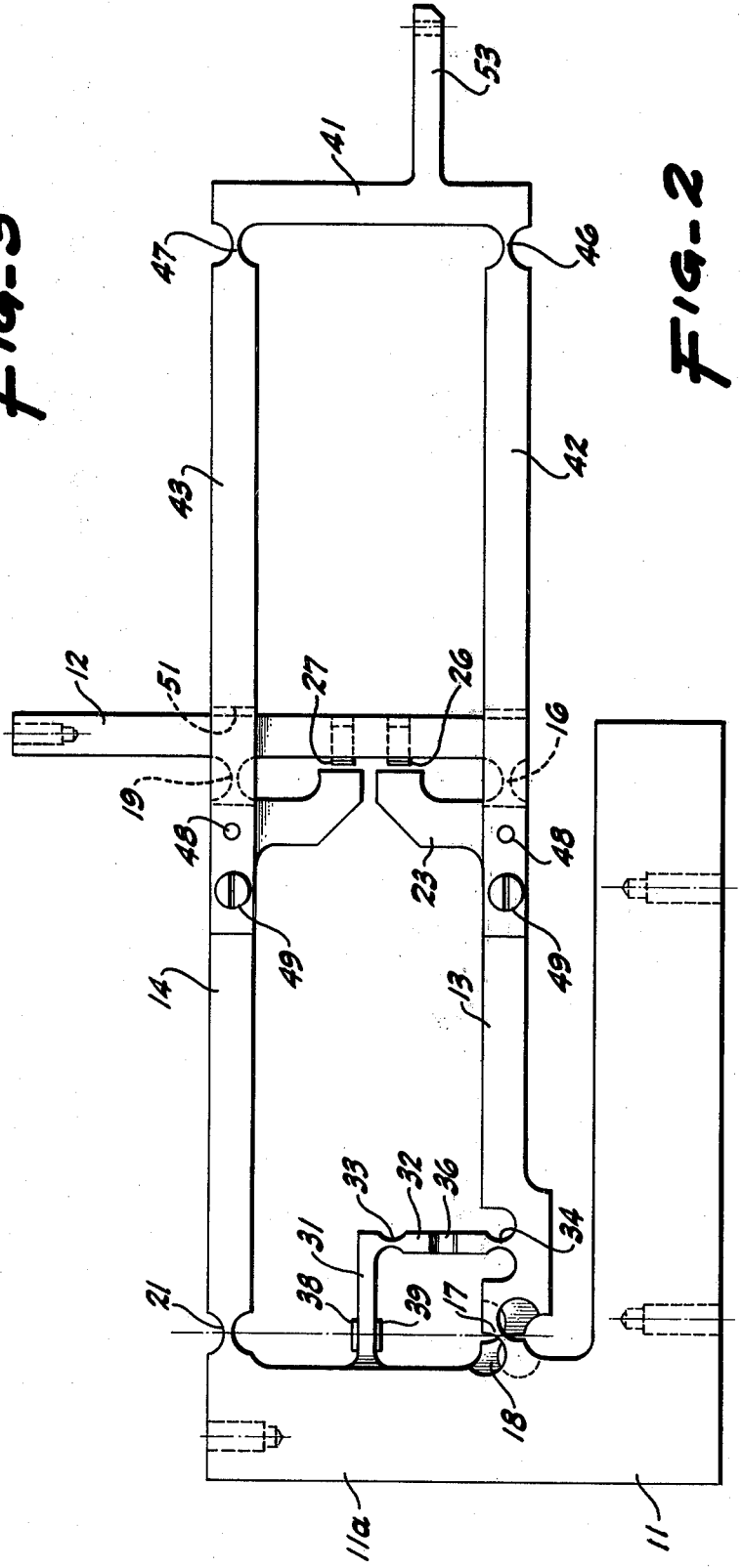

FORCE MULTIPLYING LOAD CELL

BACKGROUND OF THE INVENTION

This invention pertains generally to force transducers and more particularly to a load cell in which the magnitude of a force, such as the weight of a load, is determined by the stress produced in a bending beam to which the load is applied.

Bending beam force transducers have been utilized in stress analysis and electronic weighing applications. Examples of such transducers are found in U.S. Pat. No. 3,951,221 and in co-pending application Ser. No. 721,981, both assigned to the assignee herein.

Heretofore, load cells of this type have been provided with different capacities by varying the thickness of the bending beam, utilizing a thicker beam for larger loads. With low capacity load cells, e.g. less than 2 pounds, the beam becomes so thin that problems such as "creep" or the inability to produce consistent readings for a given load arise. In addition, as the thickness is reduced, the strain gauges and the means by which the strain gauges are bonded to the beam become a significant factor in the bending of the beam.

SUMMARY AND OBJECTS OF THE INVENTION

The invention provides a load cell utilizing a lever system and a relatively thick beam to provide highly accurate and repeatable readings even in load cells of low capacity. The load cell includes a parallelogram structure comprising a base, a load arm spaced from and generally parallel to the base, and a lever arm and a stabilizing arm extending between the load arm and base. The lever arm and stabilizing arm are connected to the load arm and base by flexures, and a load beam is affixed to the base and extends inwardly of the parallelogram structure toward the load arm. A coupling link interconnects the inner end of the load beam with a point intermediate the ends of the lever arm whereby the force applied to the beam is a multiple of the force applied to the load arm. Stress responsive elements are mounted on the beam to provide a signal corresponding to the force applied to the load arm. In one embodiment, the lever arm and the stabilizing arm extend beyond the load arm to a second load arm to provide a dual capacity load cell.

It is in general an object of the invention to provide a new and improved load cell of the type in which a load is determined by stress in a bending beam to which the load is applied.

Another object of the invention is to provide a load cell of the above character utilizing a lever system and a relatively thick beam.

Another object of the invention is to provide a load cell of the above character having first and second load receiving arms connected to different points in the lever system to provide a dual capacity load cell.

Additional objects and features of the invention will be apparent from the following description in which the preferred embodiment is set forth in detail in conjunction with the accompanying drawing.

BRIEF DESCRIPTION OF THE DRAWINGS

FIG. 2 is a side elevational view of another embodiment of a load cell according to the invention.

FIG. 3 is a top plan view of the embodiment of FIG. 2.

DESCRIPTION OF THE PREFERRED EMBODIMENTS

Figure 1:
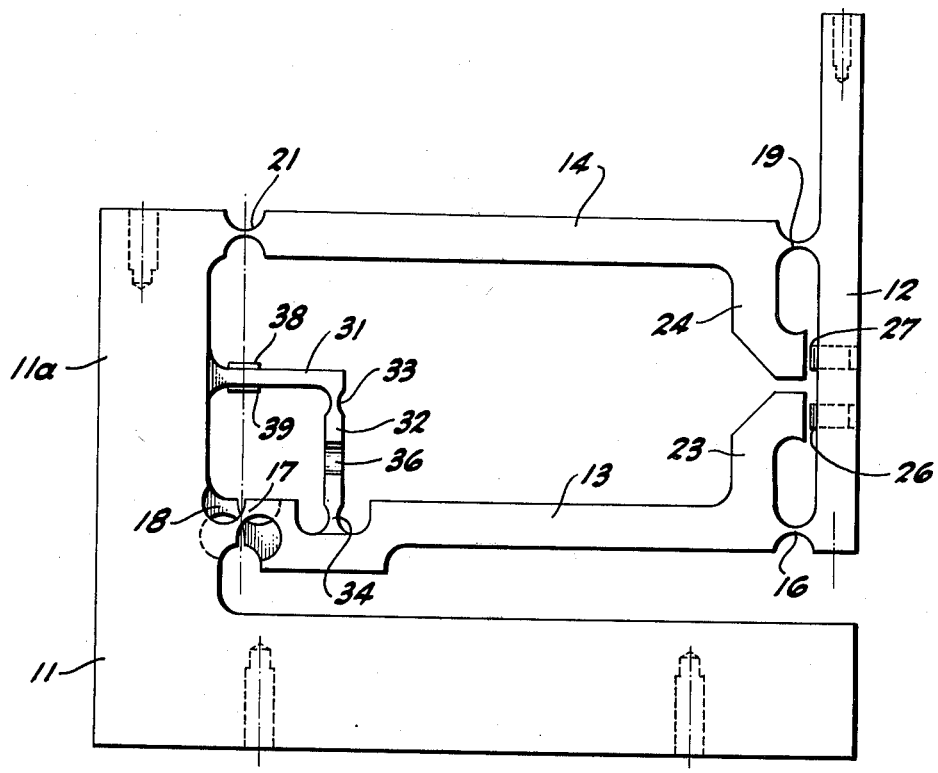
FIG. 1 is a side elevational view of one embodiment of a load cell according to the invention.

As illustrated in FIG. 1, the load cell includes a parallelogram structure comprising an L-shaped base 11, a load arm 12 spaced from and generally parallel to the upright arm 11a of the base, and a lever arm 13 and a stabilizing arm 14 which extends horizontally between the load arm and base. The lever arm is connected to the load arm by a flexure 16 and to the base by crossed flexures 17, 18. The stablizing arm is connected to the load arm and base by flexures 19, 21. Loads are applied axially to load arm 12, and lever arm 13 and stablizing arm 14 constrain the load arm for movement in the axial direction. Crossed flexures 17, 18 provide a fixed hinge point for lever arm 13 and receive the applied forces in tension and compression rather than in shear.

Stop members 23, 24 are affixed to the load arm and stablizing arm and extend toward the central portion of the load arm. Screws 26, 27 are threadedly mounted in the load arm and positioned for abuting engagement with the stop members to limit the movement of the load arm. Stop member 23 and screw 26 limit decreases in the angle between the load arm and lever arm and thereby limit downward movement of the load arm to provide overload protection. Similarly, stop member 24 and screw 27 limit decreases in the angle between the load arm and the stabilizing arm, thereby limiting upward movement of the load arm and providing protection against pulling of the arm.

A load beam 31 is affixed at one end to the upright arm 11a of the base. This beam extends inwardly of the parallelogram structure toward load arm 12. The inner end of the beam is connected to lever arm 13 by a coupling link 32 which includes flexures 33, 34 and 36. Flexures 33, 34 are oriented for bending about parallel axes which are perpendicular to the axis of the coupling link, and flexure 36 is oriented at right angles to flexures 33, 34 for bending about an axis which is perpendicular to the axis of the link and to the axes about which flexures 33, 34 bend. These flexures serve to isolate the load beam from side loading effects.

The coupling link is connected to the lever arm at a point intermediate the ends of the lever arm so that the force applied to beam 31 is a multiple of the force applied to load arm 12. The lever ratio is determined by the ratio of the distances between the coupling link and the hinge point of the lever arm and between the load arm and the hinge point of the lever arm.

Means is provided for sensing the stress produced in beam 31 and providing an output signal indicative of the applied load. This means includes strain gauges 38, 39 which are mounted on the upper and lower surfaces of beam 31 in alignment with flexures 17, 18 and 21. These elements can be of suitable known design, such as resistive or semiconductor strain gauges. In the preferred embodiment, the strain gauges are resistive devices connected in a conventional bridge circuit. Electrical connections to the strain gauges are omitted for ease of illustration.

In the embodiment of FIG. 1, the load cell preferably is fabricated as a unitary structure by a suitable process such as casting, milling, or a combination thereof. Suitable materials include aluminum alloys, steel and stainless steel. The sides of the load cell are covered by planar side plates (not shown) which are secured to the base by mounting screws or rivets.

Operation and use of the load cell of FIG. 1 are as follows. It is assumed that base 11 has been secured to a suitable mounting surface and that a load receiving member, such as the platform of a scale has been mounted on load arm 12. A load applied to the platform will cause the load arm to move downwardly, exerting a downward force on the outer end of lever arm 13. This force is increased by the lever ratio and applied to beam 31 by coupling link 32. The resistances of strain gauges 38, 39 changes in accordance with the stress produced in the beam.

Screw 26 is adjusted so that in the event of a load in excess of the capacity of the load cell, the screw will abut against stop member 23 to limit the downward movement of the load arm and thereby prevent damage to the load cell from overloading. Similarly, screw 27 is adjusted to abut against stop member 24 in the event of an upward pull on the load arm which might otherwise damage the load cell.

The embodiment of FIGS. 2 and 3 is generally similar to the embodiment of FIG. 1, with the addition of a second load arm 41. In this embodiment, lever arm 13 and stabilizing arm 14 are extended beyond load arm 12 by extension arms 42, 43 which are connected to load arm 41 by flexures 46, 47. The inner ends of arms 42, 43 are bifurcated or forked for connection to the lever arm and the stabilizing arm. The extension arms are rigidly affixed to the lever and stalibizing arms by pins 48 and screws 49 at points spaced inwardly from flexures 16, 19 and load arm 12. The openings 51 in the bifurcated ends of the extension arms are of sufficient size to clear flexures 16, 19 and load arm 12, and in the embodiment illustrated, spacers 52 are utilized between the extension arms and the lever and stabilizing arms at the points of attachment.

Extension arms 42, 43 extend in axial alignment from lever arm 13 and stabilizing arm 14, and load arm 41 as short, horizontally extending portion 53 to which the load is applied.

Operation and use of the embodiment of FIG. 2–3 is generally similar to that discussed above in connection with FIG. 1. However, the load cell of FIGS. 2–3 has a dual capacity in that loads can be applied both to load arm 12 and to load arm 41. Because of the difference in lever ratios, loads applied to load arm 41 cause a greater force to be exerted on beam 31 than do loads applied to load arm 12. Less, load arm 12 can be considered a "high capacity" load arm, and load arm 41 can be consider a "low capacity" load arm.

The load cell has a number of important features and advantages. Beam 31 is effectively isolated from the effects of side loading so that the load cell can provide accurate readings even though the load may be displaced from the axis of load arm 12 or load arm 41. Because of the force mulitiplying effect of lever arm 13, a thicker beam can be utilized than has heretofore been possible in low capacity load cells. This effectively eliminates the heretofore limited the accuracy and repeatablity of readings obtained with low capacity low cells of the bending beam type.

It is apparent from the foregoing that a new and improved load cell has been provided. While only the presently preferred embodiment has been described, as will be apparent to those familiar with the art, certain changes and modifications can be made without departing from the scope of the invention as defined by the following claims.

What is claimed is:

1. In a load cell: a base, a load arm spaced from the base for receiving a load applied in an axial direction, a lever arm with flexures toward the ends thereof interconnecting the load arm and base, a stabilizing arm with flexures interconnecting the load arm and base and cooperating with the lever arm to constrain the load arm for movement in the axial direction, a load beam affixed at one end to the base, a coupling link interconnecting the lever arm and the load beam, said link being connected to the lever arm at a point intermediate the ends thereof, and means responsive to stress in the load beam for providing an output signal corresponding to the load applied to the load arm.

2. The load cell of claim 1 wherein the means responsive to stress comprises a strain responsive element mounted on the load beam.

3. The load cell of claim 2 wherein the strain responsive element is positioned in linear alignment with the flexures which connect the lever arm and the stabilizing arm to the base.

4. The load cell of claim 1 wherein the base, arms, flexures, coupling link and beam are fabricated as a unitary structure of a homogeneous material.

5. In a load cell: a base, a load arm spaced from and generally parallel to the base for receiving an axially applied load, a lever arm extending between the load arm and base and connected thereto by flexures, a stabilizing arm generally parallel to the lever arm and connected to the load arm and base by flexures, a load beam rigidly connected to the base and extending inwardly therefrom toward the load link, a coupling arm extending in a direction generally parallel to the base and interconnecting the lever arm and the inner end of the load beam, said coupling link being connected to the lever arm at a point spaced toward the base from the flexure which connects the lever arm to the load arm, and a stress responsive element mounted on the load beam for providing an output signal corresponding to the load applied to the load arm.

6. The load cell of claim 5 wherein the stress responsive element is aligned with the flexures which connect the lever arm and the stabilizing arm to the base.

7. The load cell of claim 5 wherein the base, arms, flexures, load beam and coupling link are fabricated as a unitary structure.

8. In a load cell: a base, a load arm spaced from the base for receiving a load applied in an axial direction, a lever arm with flexures interconnecting the load arm and base, a stabilizing arm with flexures interconnecting the load arm and base and cooperating with the lever arm to constrain the load arm for movement in the axial direction, a load beam affixed at one end to the base, a coupling link interconnecting the lever arm and the load beam, said link being connected to the lever arm at a point intermediate the ends thereof, means responsive to stress in the load beam for providing an output signal corresponding to the load applied to the load arm, and stop means carried by the lever arm and the load arm for limiting the axial movement of the load arm in one direction.

9. The load cell of claim 8 wherein the stop means includes a stop member affixed to the lever arm and means carried by the load arm for abutting engagement with the stop member.

10. In a load cell: a base, a load arm spaced from the base for receiving a load applied in an axial direction, a lever arm with flexures interconnecting the load arm and base, a stabilizing arm with flexures interconnecting the load arm and base and cooperating with the lever arm to constrain the load arm for movement in the axial direction, a load beam affixed at one end to the base, a coupling link interconnecting the lever arm and the load beam, said link being connected to the lever arm at a point intermediate the ends thereof, means responsive to stress in the load beam for providing an output signal corresponding to the load applied to the load arm, and stop means carried by the stabilizing arm and the load arm for limiting axial movement of the load arm in one direction.

11. The load cell of claim 10 wherein the stop means includes a stop member affixed to the stabilizing arm and means carried by the load arm for abutting engagement with the stop member.

12. In a load cell: a base, first and second load arms for receiving loads applied in an axial direction, a lever arm connected to the base by a flexure, means including flexures connecting the load arms to the lever arm at different distances from the base, a stabilizing arm with flexures interconnecting the load arms and base and cooperating with the lever arm to constrain the load arms for movement in the axial direction, a load beam rigidly connected to the base, a coupling link interconnecting the lever arm and the load beam, and means responsive to stress in the load beam for providing output signals corresponding to loads applied to the load arms.

13. In a load cell: first and second load receiving arms, a bending beam, a lever system interconnecting the load receiving arms and beam for applying bending forces to the beam in response to loads applied to the load receiving arms, said lever system having different lever ratios for the respective load receiving arms, and means responsive to stress in the beam for providing output signals corresponding to the loads.

14. In a load cell: a base, a load arm spaced from and generally parallel to the base for receiving an axially applied load, a lever arm extending between the load arm and base and connected thereto by flexures, a stabilizing arm generally parallel to the lever arm and connected to the load arm and base by flexures, a load beam rigidly connected to the base and extending inwardly therefrom toward the load arm, a coupling arm extending in a direction generally parallel to the base and interconnecting the lever arm and the inner end of the load beam, a stress responsive element mounted on the load beam for providing an output signal corresponding to the load applied to the load arm, a stop member affixed to the lever arm and extending toward the central portion of the load arm, and a screw mounted on the load arm for abutting engagement with the stop member to limit movement of the load arm as the angle between the load arm and the lever arm changes.

15. In a load cell: a base, a load arm spaced from and generally parallel to the base for receiving an axially applied load, a lever arm extending between the load arm and base and connected thereto by flexures, a stabilizing arm generally parallel to the lever arm and connected to the load arm and base by flexures, a load beam rigidly connected to the base and extending inwardly therefrom toward the load arm, a coupling arm extending in a direction generally parallel to the base and interconnecting the lever arm and the inner end of the load beam, a stress responsive element mounted on the load beam for providing an output signal corresponding to the load applied to the load arm, a stop member affixed to the stabilizing arm and extending toward the central portion of the load arm, and a screw mounted on the load arm for abutting engagement with the stop member to limit movement of the load arm as the angle between the load arm and the stabilizing arm changes.

16. In a load cell: a base, a load arm spaced from the base for receiving a load applied in an axial direction, a lever arm connected at one end to the load arm, crossed flexures connecting the other end of the lever arm to the base, a stabilizing arm with flexures interconnecting the load arm and base and cooperating with the lever arm to constrain the load arm for movement in the axial direction, a load beam affixed at one end to the base, a coupling link interconnecting the lever arm and the load beam, said link being connected to the lever arm at a point intermediate the ends thereof, and means responsive to stress in the load beam for providing an output signal corresponding to the load applied to the load arm.

17. In a load cell: a base, a load arm spaced from the base for receiving a load applied in an axial direction, a lever arm with flexures toward the ends thereof interconnecting the load arm and the base, a stabilizing arm with flexures interconnecting the load arm and base and cooperating with the lever arm to constrain the load arm for movement in the axial direction, a load beam affixed at one end to the base, a coupling link interconnecting the lever arm and the load beam with flexures oriented for bending about axes perpendicular to each other and to the axis of the link, said link being connected to the lever arm at a point intermediate the ends thereof, and means responsive to stress in the load beam for providing an output signal corresponding to the load applied to the load arm.

18. In a load cell: a base, a load arm spaced from the base for receiving a load applied in an axial direction, a lever arm with flexures toward the ends thereof interconnecting the load arm and the base, a stabilizing arm with flexures interconnecting the load arm and base and cooperating with the lever arm to constrain the load arm for movement in the axial direction, a load beam affixed at one end to the base, a coupling link interconnecting the lever arm and the load beam, said link being connected to the lever arm at a point intermediate the ends thereof, a second load arm spaced from the first-named load arm and connected to the lever arm and the stabilizing arm by additional flexures, and means responsive to stress in the load beam for providing an output signal corresponding to the load applied to the load arms.

19. In a load cell: a base, a load arm spaced from and generally parallel to the base for receiving an axially applied load, a lever arm extending between the load arm and base and connected thereto by flexures, the lever arm being connected to the base by crossed flexures oriented for bending about an axis perpendicular to the lever arm and base, a stabilizing arm generally parallel to the lever arm and connected to the load arm and base by flexures, a load beam rigidly connected to the base and extending inwardly therefrom toward the load arm, a coupling link extending in a direction generally parallel to the base and interconnecting the lever arm and the inner end of the load beam, and a stress responsive element mounted on the load beam for providing an output signal corresponding to the load applied to the load arm.

20. In a load cell: a base, a load arm spaced from and generally parallel to the base for receiving an axially applied load, a lever arm extending between the load arm and base and connected thereto by flexures, a stabilizing arm generally parallel to the lever arm and connected to the load arm and base by flexures, a load beam rigidly connected to the base and extending inwardly therefrom toward the load arm, a coupling link extending in a direction generally parallel to the base and interconnecting the lever arm and the inner end of the load beam, said coupling link comprising a rigid member with flexures oriented for bending about axes which are perpendicular to each other and to the axis of the link, and a stress responsive element mounted on the load beam for providing an output signal corresponding to the load applied to the load arm.

21. In a load cell: a base, a load arm spaced from and generally parallel to the base for receiving an axially applied load, a lever arm extending between the load arm and base and connected thereto by flexures, a stabilizing arm generally parallel to the lever arm and connected to the load arm and base by flexures, a load beam rigidly connected to the base and extending inwardly therefrom toward the load arm, a coupling link extending in a direction generally parallel to the base and interconnecting the lever arm and the inner end of the load beam, a second load arm spaced from the first-named load arm and connected to the lever arm and the stabilizing arm by additional flexures, and a stress responsive element mounted on the load beam for providing an output signal corresponding to the load applied to the load arms.

22. In a load cell: a load receiving arm, a bending beam, a lever system interconnecting the load receiving arm and beam for applying a bending force to the beam in response to a load applied to the load receiving arm, said force being greater than the applied load, a second load receiving element connected to the lever system at a different point than the first-named load receiving arm, and means responsive to stress in the beam for providing an output signal corresponding to the load.

* * * * *